United States Patent [19]
Pausch

[11] 3,765,152
[45] Oct. 16, 1973

[54] CLEANING OF FILTERING MEDIA

[75] Inventor: Josef Pausch, Hopkins, Minn.

[73] Assignee: General Resource Corporation, Hopkins, Minn.

[22] Filed: Nov. 4, 1970

[21] Appl. No.: 86,703

[52] U.S. Cl. ........................ 55/96, 55/302, 55/341, 417/197
[51] Int. Cl. ............................................ B01d 46/04
[58] Field of Search ..................... 55/96, 291, 292, 55/302, 303, 341; 417/197

[56] References Cited
UNITED STATES PATENTS

| | | | |
|---|---|---|---|
| 3,410,056 | 11/1968 | Reinauer | 55/96 |
| 3,429,106 | 2/1969 | Abboud | 55/292 |
| 3,436,899 | 4/1969 | Pausch | 55/302 |
| 3,509,698 | 5/1970 | Medcalf et al. | 55/302 |
| 3,594,992 | 7/1971 | Carr et al. | 55/302 |
| 3,606,736 | 9/1971 | Leliaert et al. | 55/302 |
| 1,814,613 | 7/1931 | Woody | 417/197 |
| 1,901,797 | 3/1933 | Black | 417/197 |

Primary Examiner—Bernard Nozick
Attorney—Whiteley & Caine

[57] ABSTRACT

This invention provides an improved method and apparatus for maintaining the permeability of the porous filtering media used in filtering a gaseous suspension by providing an ever-open passage disposed in the path of fluid flow which, in turn, receives at an intermediate area the injection of compressed gas having the dual function of terminating normal flow through the passage, and providing a reverse flow by inducing other gaseous fluid into the ever-open passage to dislodge accumulated solids from the filtering media.

8 Claims, 9 Drawing Figures

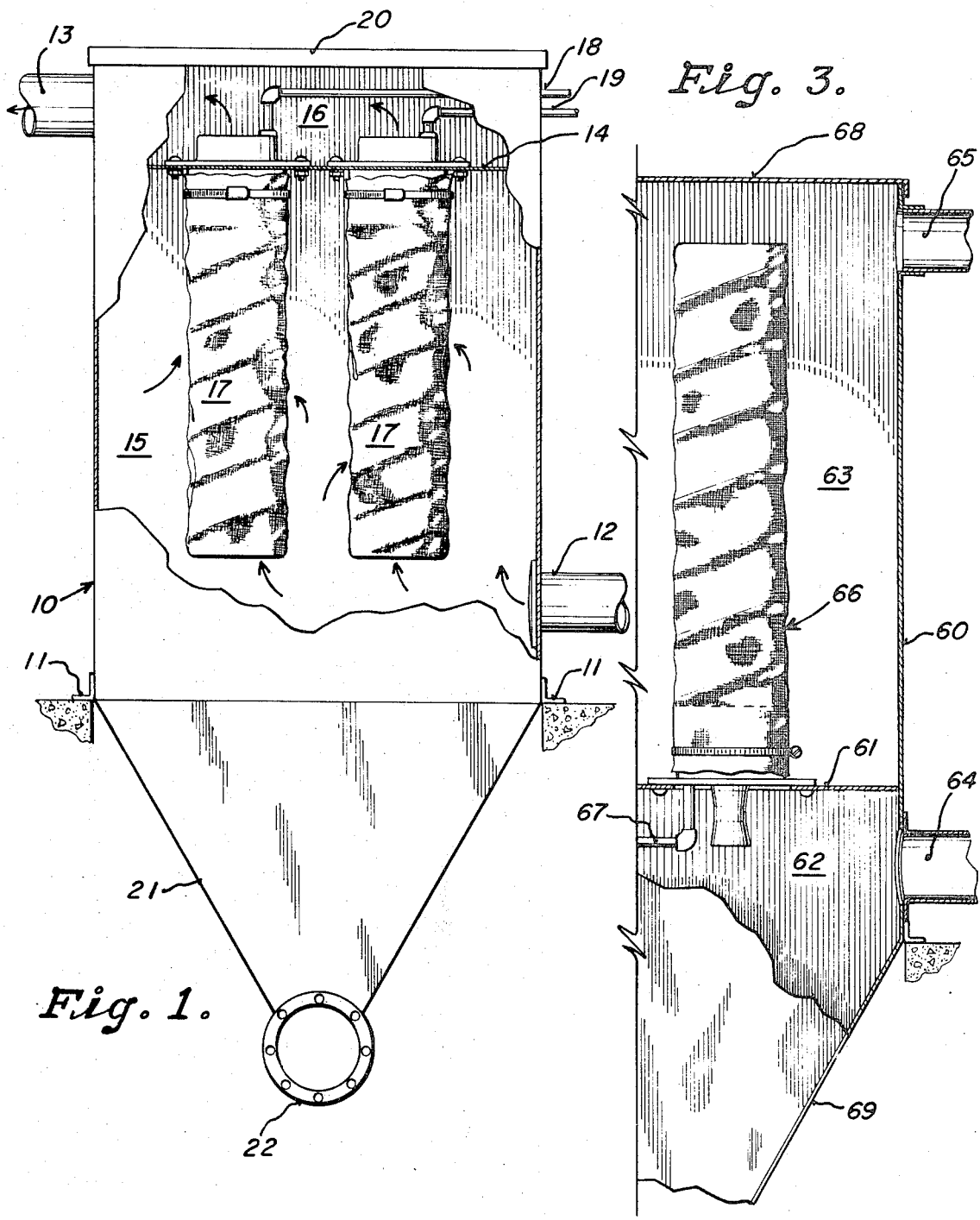

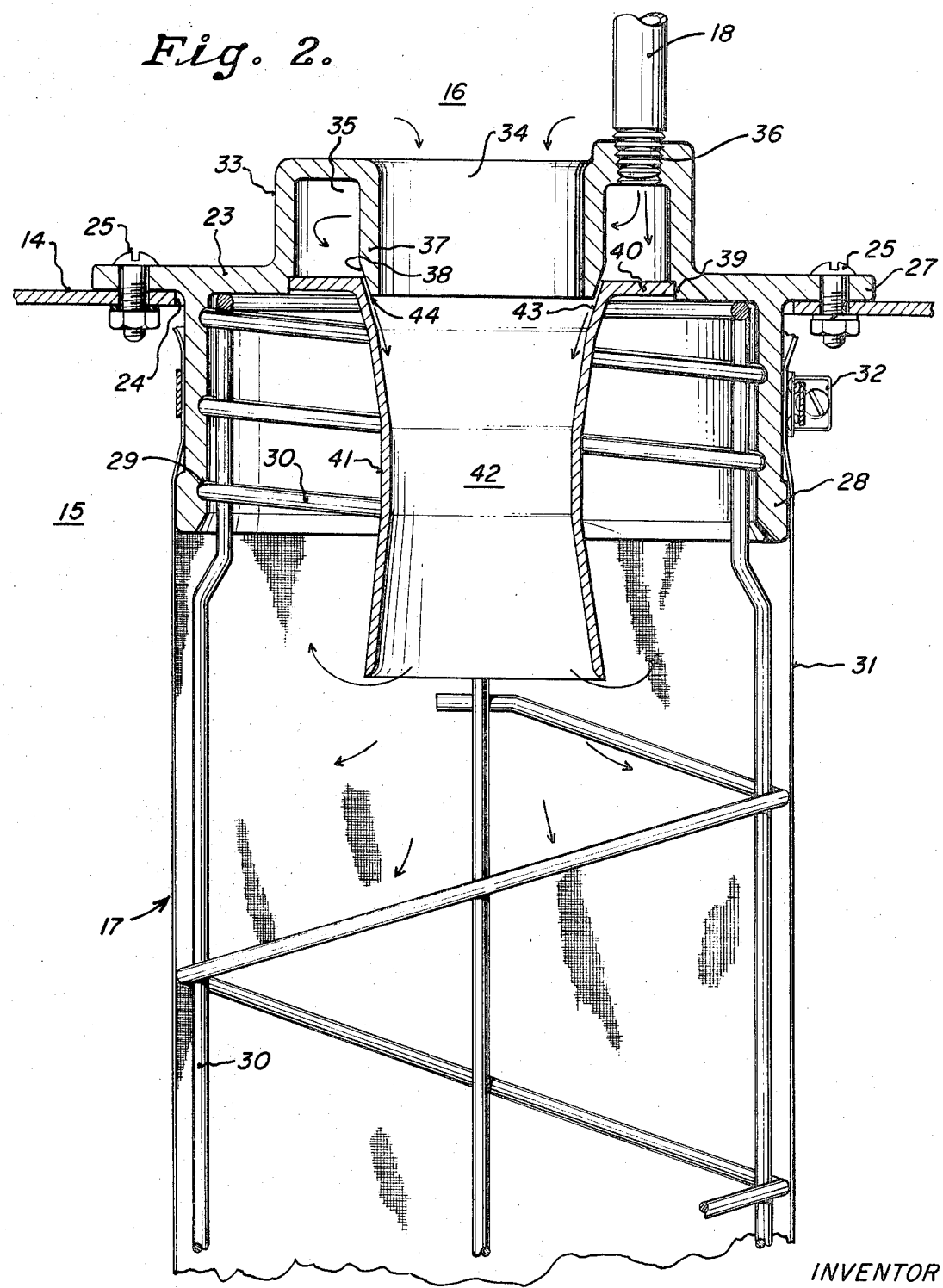

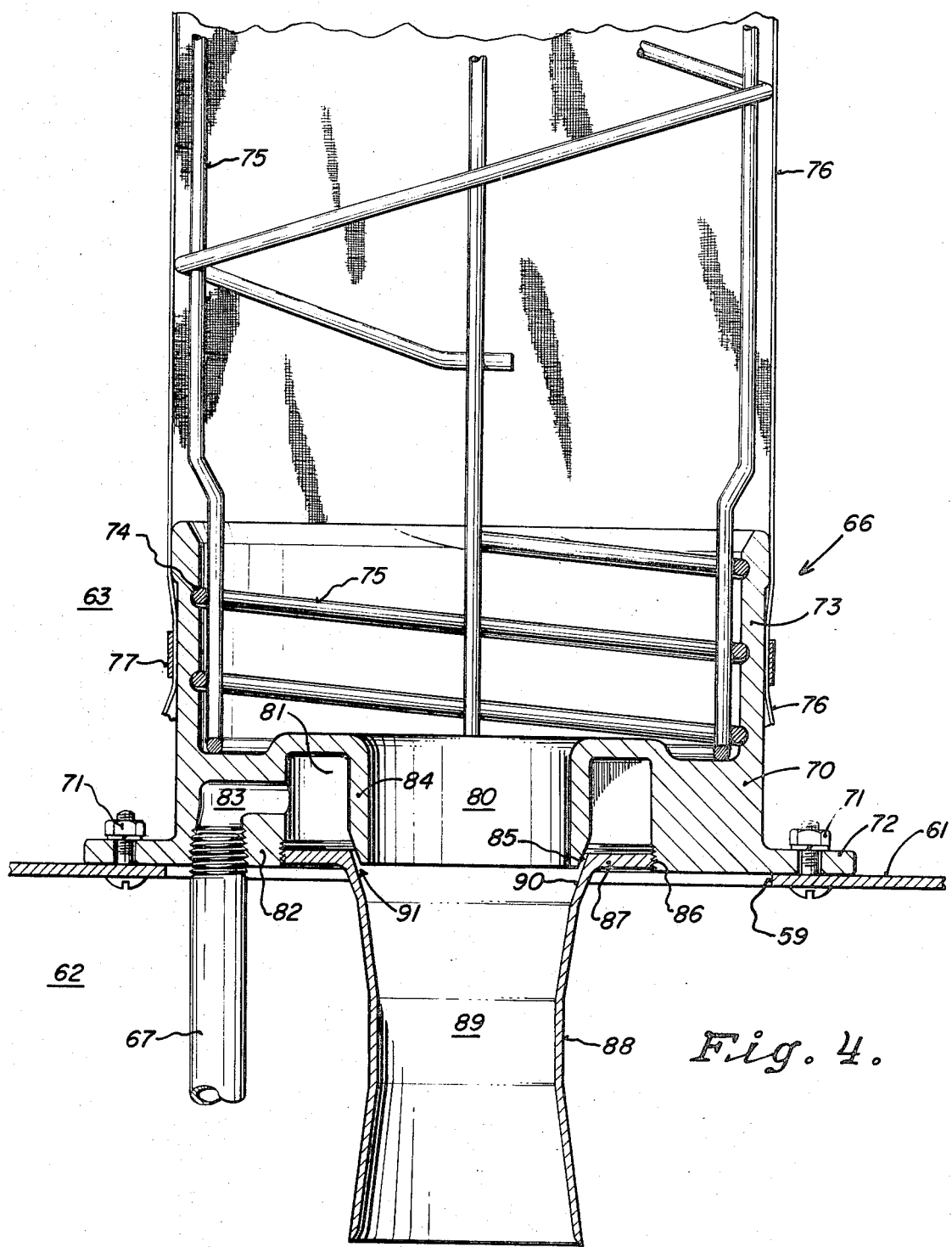

INVENTOR
Josef Pausch
BY
Whiteley and Caine
ATTORNEYS

INVENTOR
Josef Pausch
BY
Whiteley and Caine
ATTORNEYS

CLEANING OF FILTERING MEDIA

This invention relates to the filtration of gaseous suspensions, and more particularly to a method and apparatus for maintaining the permeability of the porous filter media used to separate the solid particulate matter thereon. This is accomplished not merely by the reversal of flow, but by the induction of additional gas that acts in conjunction with the compressed gas to discharge accumulated solids from the filter media.

It is already well known in the art to provide methods and means for removing accumulated solids from a porous filter surface by the use of compressed gas injected into the system in opposition to the normal flow of the filtering fluid. One example of these prior arrangements is disclosed in my prior U.S. Pat. No. 3,499,268.

In the present invention, the compressed gas is introduced into an ever-open passage at an intermediate area within said passage, between its opposite ends, and in a direction generally opposite to the direction of the filtering flow. The arrangement of my present invention has an advantage that it may utilize a cleaning gas of lower pressure than prior practices, and also it has the advantage of inducing gases that are ambient to one end of the passage to aid in the action of dislodging solids accumulated on the surface of the filter media.

The invention will be best understood by reference to the following specification, together with the drawings which form a part hereof. In the drawings:

FIG. 1 is an elevation of one modification of the present invention with some parts broken away to show interior construction;

FIG. 2 is an enlarged sectional detail of a portion of the apparatus disclosed in FIG. 1;

FIG. 3 is a partial view, somewhat like FIG. 1, of a modification of the invention;

FIG. 4 is a sectional detail of some of the structure shown in FIG. 3;

Figures 5, 8:
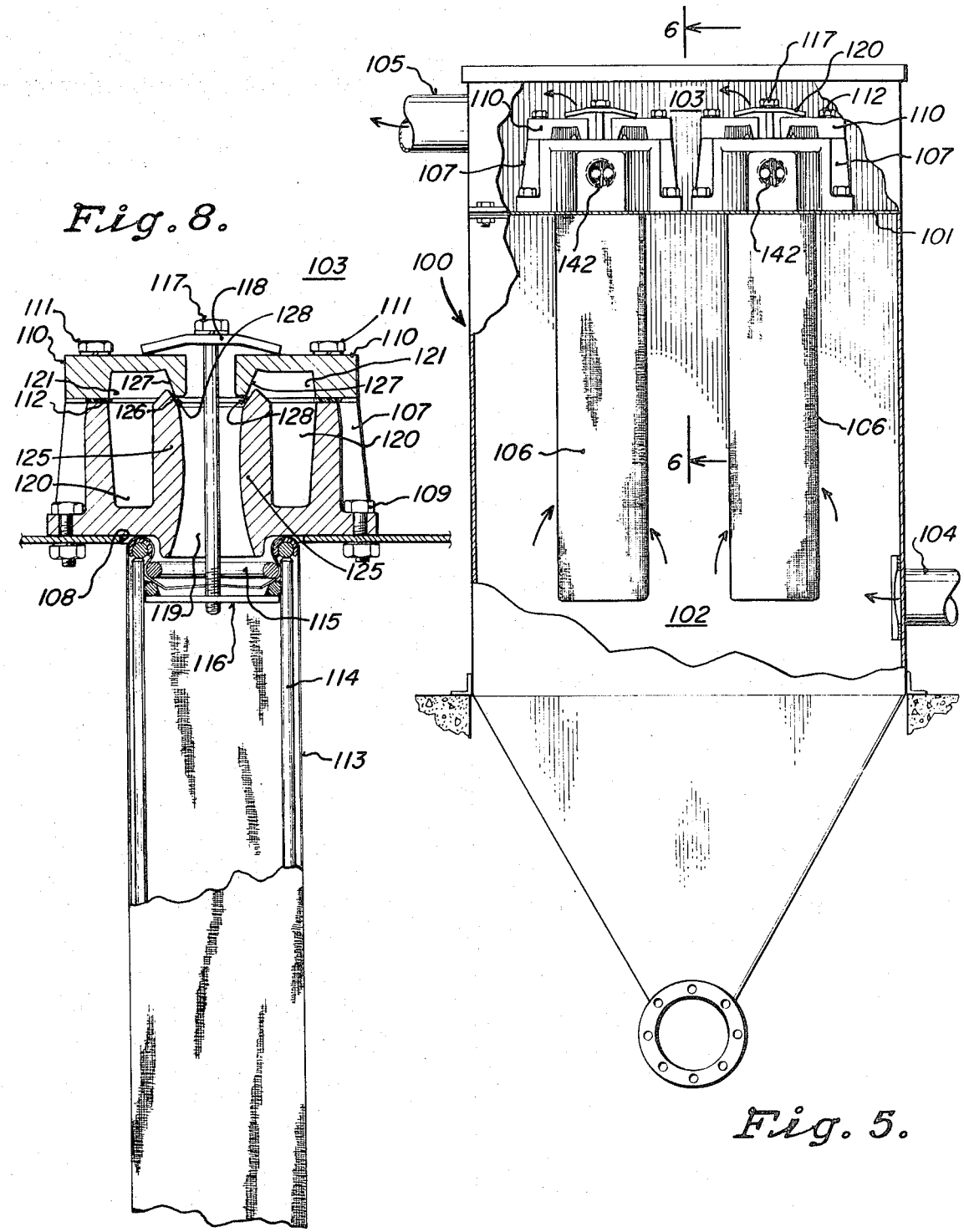
FIG. 5 is a view similar to FIG. 1 of a third modification of the invention.
FIG. 8 is a sectional view taken on the lines 8—8 of FIG. 6.
Figure 6:
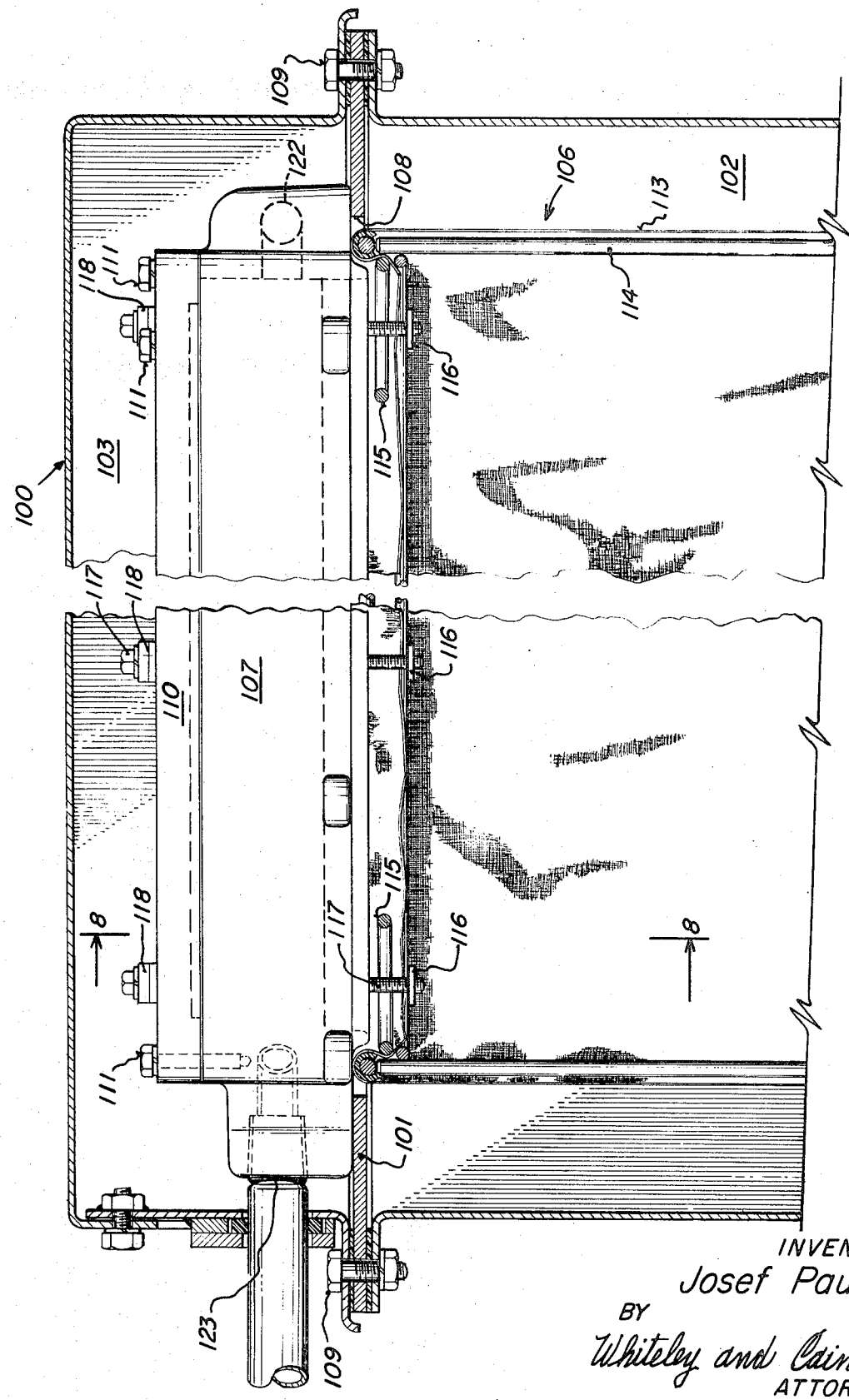
FIG. 6 is a sectional view taken on the lines 6—6 of FIG. 5, with some parts being further shown in section.
Figure 7:
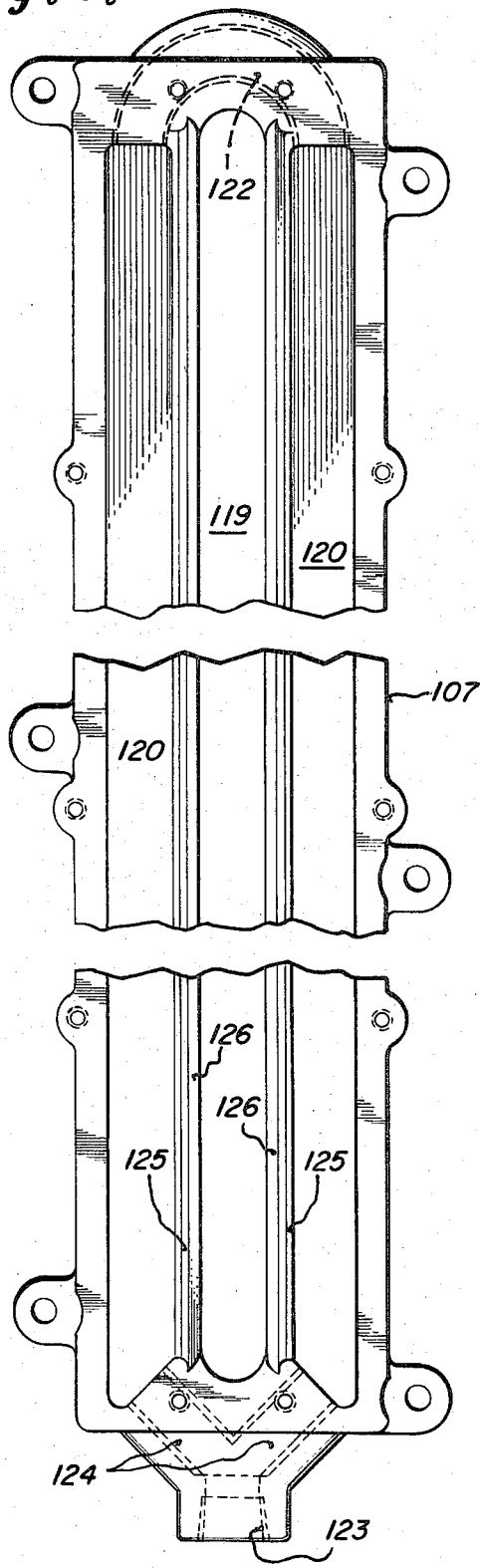
FIG. 7 is a plan view of an element of the structure shown in FIG. 5.

Referring to FIG. 1, the first embodiment of my invention comprises a device for filtering fluid suspensions, comprising a housing 10 suitably supported at 11, 11, containing an inlet conduit 12 and an outlet conduit 13. Within its interior, housing 10 is divided by a partition 14 to provide a first zone 15 where the gaseous suspension is received and a second zone 16 above the partition 14 which defines a clean gas zone and from which the filtered gas leaves the housing 10. Within the interior of housing 10 and interconnecting the chambers 15 and 16 are a plurality of similar filter assemblies 17, one of which is partially shown in greater detail in FIG. 2. Although FIG. 1 shows only two of the filtering assemblies or units 17, it is a general practice to provide a larger number of these units within a casing, and in general, the units operate in banks, as will be disclosed hereinafter. Each of the filtering units 17 is coupled to a source of cleaning gas composed of compressed air or the like, which is conducted through conduits 18 and 19 that may pass through a timer or distributor disposed between the source of gas and the units 17. The housing 10 has a top cover 20 which provides access to the chamber 15. The housing 10 also has a lower hopper 21 that extends to a lower collection aperture 22, through which the solid matter separated from the gas and falling to the bottom of the chamber may be removed.

In FIG. 2, assembly 17 comprises a support member 23 mounted in an aperture 24 in partition 14 by suitable fastening means 25. Member 23 includes a mounting flange 27 and a downwardly projecting rim 28 that is internally threaded at 29 to receive a supporting frame 30 for a porous filtering element 31, here shown as a fabric bag which is secured to the downwardly projecting rim 28 by a suitable clamping means 32.

The support member 23 has formed integral therewith a central boss 33 having a large central aperture 34. The boss 33 contains an annular passage 35 which is threaded at 36 to receive a conduit 18 that extends from a source of compressed gas. Between the central aperture 34 and the passage 35 is an annular wall 37, the lower end of which is tapered as at 38.

Member 23 further includes an annular step 39 into which is pressed or otherwise assembled a flange 40 of an aerodynamically configured venturi tubular member 41 that extends downwardly from member 23 into the interior of the filtering element 31. The member 41 forms an ever-open passage 42 between the interior of the filter element 17 at the one end, and the central aperture 34 of member 23 at the other end. At its upper end, member 41 is tapered as indicated at 43, and said taper is spaced from and coacts with the tapered surface 38 of member 37 so as to define an annular nozzle or jet-like passage 44. When clean gas under pressure is supplied by conduit 18 to the annular channel 35, the jet stream from the annular passage 44 forms a downwardly extending cone within the ever-open passage 42 to terminate the normal upward flow of gaseous fluid, and it also acts to induce gases ambient with the upper end of the passage 34 to enter the passage 42 and be injected into the interior of the filter assembly 17, as shown by the several arrows seen in FIG. 2. When the supply of compressed gas from conduit 18 is terminated, normal filtering operation of the apparatus is resumed.

FIG. 3 shows a modification of the apparatus disclosed in FIGS. 1 and 2. Here a housing 60 contains a partition 61 in the interior thereof, which divides the interior of the housing into an inlet chamber 62 and a clean gas chamber 63. An inlet conduit 64 is provided for conducting the fluid suspension into the housing, and a conduit 65 forms an outlet for filtered gas. As in the example of FIG. 1, the partition 61 carries a plurality of cleaning assemblies, one of which is shown and identified by reference numeral 66, a part of which is shown in greater detail in FIG. 4. A conduit 67 for cleaning gas under pressure extends into the assembly. The housing 60 contains a top closure 68 and a lower hopper 69.

Referring now to FIG. 4, assembly 66 is composed of a support member 70 mounted in an aperture 59 in partition 61 and held by suitable fastening means 71. Member 70 includes a mounting flange 72 and an upwardly projecting ring 73 which is internally threaded at 74 to receive a supporting frame 75 for a porous element 76 which is secured to the outside of ring 73 by suitable clamping means 77. The frame 75 is not essential to this structure, but is shown as one means for supporting the porous filter element 76.

Member 70 has a large central aperture 80 through which particle laden gas normally passes upwardly into the interior of the filter element 76. Member 70 is formed with an annular passage 81 which is suitably tapped at 82 to receive a compressed gas conduit 67. A passage 83 connects conduit 67 with passage 81. Between aperture 80 and passage 81 is an annular wall 84, the lower end of which is tapered as at 85.

Member 70 is internally threaded at 86 to receive the flange 87 of aerodynamically configured venturi member 88. Member 88 extends downwardly into chamber 62 and is external to the filter element 76. It has a central passage 89 which forms an ever-open passage between chamber 62 and the interior of the filter element 76. At its upper end, member 88 diverges, as indicated at 90, and this surface coacts with the taper 85 on wall 84 to define an annular nozzle or jet passage 91. By reason of the threaded connection 86, the degree of opening, or the dimension of the passage 91 may be adjusted.

Under normal operation, the dust-bearing gas is conducted into chamber 62 and it flows upwardly through the ever-open passage 89 into the interior of the filter element 76 where the solid particulate matter is separated from the gas, and the clean filtered gas thence passes into the clean gas chamber 63 and leaves the housing 60 through the outlet 65. When compressed gas enters conduit 67 and the annular passage 81, it flows as an annular cone through the passage 91 into the ever-open passage to reverse the direction of flow through the ever-open passage 89, thus causing gas in chamber 63 to flow in a reverse direction through the filter element 76, dislodging the accumulated solids on the interior of the porous element, and causing the same to be drawn outwardly through the ever-open passage 89 into chamber 62.

Referring now to FIGS. 5-8, there are illustrated views of a further modification of the invention wherein the filtering elements consist of large relatively flat envelopes that take the place of the cylindrical tubes shown heretofore. In FIGS. 5-8, housing 100 is provided with a partition 101 that divides the interior of the housing into a receiving gas zone 102 and a clean gas zone 103. The housing is provided with an inlet conduit 104 that communicates with zone 102, and an outlet conduit 105 that communicates with the clean gas zone 103. As in all prior instances of the invention, means are provided for supplying a gas containing solid particles to and through the conduit 104, and for removing the filtered clean gas from the conduit 105. In practice, this is frequently done by means of a blower, not shown, that draws the gases from conduit 105. Supported on the partition 101 are a plurality of cleaning assemblies 106, parts of which are shown in greater detail in FIGS. 6-8. Each filtering assembly 106 includes a support member 107 mounted in an aperture 108 in partition 101 and secured to said partition by suitable fastening means 109. Each support means 107 is provided with a cap member 110 that is secured to the support by fastening means 111, and suitable gasket means 112 serving to seal the joint.

A porous filter element 113, which assumes the form of a large envelope sealed on the opposite lateral edges and the bottom, but open at the top, is held on a supporting frame 114 by a sinuous resilient member 115 that extends about the top of element 113. The supporting frame 114 includes a plurality of cross members 116 spaced along the length of the top opening of the filter element and supported on the lower end of mounting bolts 117, the latter, in turn, extending through saddle members 118 that rest on the upper surface of the cap members 110.

The support member 107 is formed with an elongated aerodynamically configured aperture 119 that forms an ever-open passage between the interior of the filter element 113, and the clean air space 103 above the partition 101. The member 107 is formed with an internal channel 120 which is in communication with a channel 121 formed in each of the cap members 110. The channel 121 is made continuous at one end of the structure by a U-shaped portion 122, seen in FIG. 7. The opposite ends of the channel are connected to a source of compressed gas through an opening 123 that extends to branches 124, also shown in FIG. 7.

Member 107 on either side of the central channel 119 is formed with wall portions 125, whose upper edges are tapered at 126. The cap members 110 are provided with tapered edges 127 that cooperate with the tapered edges 126 to form on either side of the central passage 119 elongated apertures 128 by which compressed gas present in the channel 120 may pass into the central passage 119 on either side thereof and at an angle which is at least partially opposite the normal upward flow of gas from the interior of the filter element 113 into the clean gas zone 103.

The operation of the structure disclosed in FIGS. 5-8 is quite similar to the procedure previously described.

Figure 9:
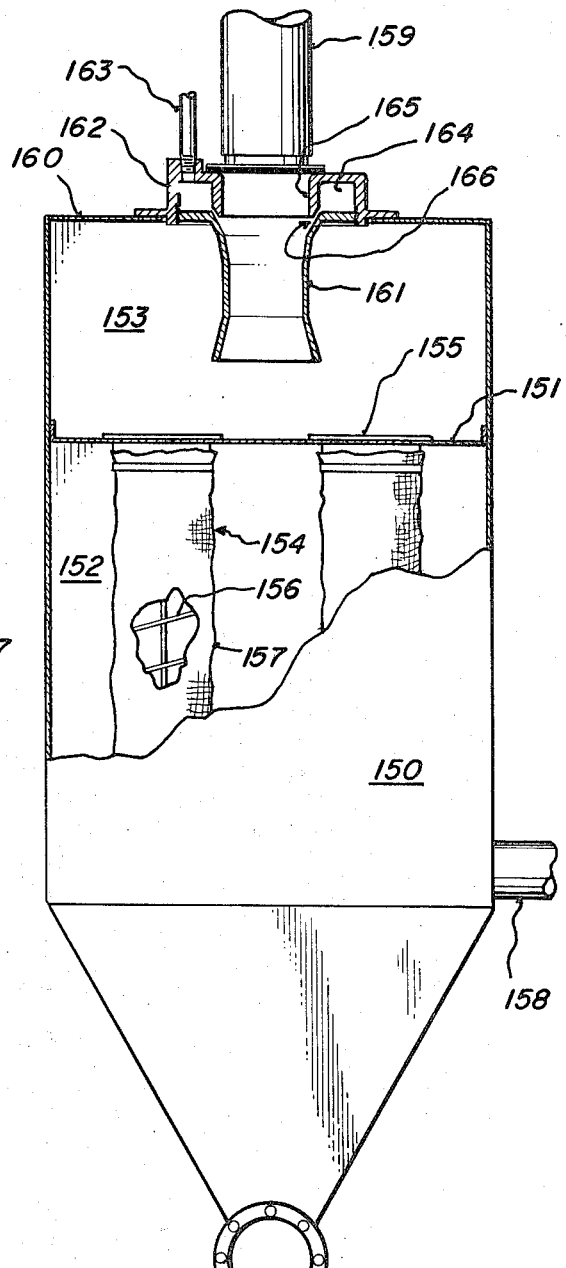
FIG. 9 is a view somewhat similar to FIG. 1, showing a further modification of the invention.

Referring now to FIG. 9 is shown a further modification of the invention that differs from the prior disclosures in that in the prior disclosures an individual ever-open passage has been provided for each filter element, whereas in FIG. 9, one tubular element acts to serve a plurality of filter assemblies. Having reference to FIG. 9, reference numeral 150 discloses a housing that contains a partition 151 separating the interior thereof into a receiving gas zone 152, and a clean gas zone 153. Within the interior of housing 150 are a plurality of filter assemblies 154, each composed of an annular support member 155 secured to the partition 151, and which, in turn, supports a wire frame 156. Surrounding the frame 156 and secured to the support 155 is a foraminous filter element 157. The housing 150 is provided with an inlet opening 158 for particle bearing gas, and an outlet opening 159 that is carried by a cover structure 160. A tube 161 is carried by the cover structure 160 in prolongation of the interior of the outlet 159 to form an ever-open passage between the clean air space 153 and the interior of passage 159. Mounted in surrounding relationship to the outlet tube 159 is an annular member 162 which is connected to a conduit 163 that extends from a source of compressed gas. Member 162 contains an annular passage 164. Member 162 also has an inner annular wall 165 in which is formed an annular slot 166 that extends downwardly at an angle into the interior of the tube 161 forming a passage for compressed gas from the channel 164 into the interior of the ever-open passage 161.

The operation of the structure disclosed in FIG. 9 is relatively similar to the operation of the previously disclosed structures. Filtering occurs in the usual manner by the introduction of particle bearing gas through the inlet passage 158. Clean gas is withdrawn through the outlet duct 159, and all of the clean gas passes from the zone 153 through the ever-open passage 161 to the outlet passage 159. For cleaning, compressed gas is admitted through the conduit 163 to the channel 164 and thence through the narrow orifice 166 forming a vortex within the interior of the ever-open passage 161 inducing purging gas from the outlet passage 159 into the clean air space 153 within the interior of housing 150, the single ever-open passage 161 providing sufficient gas to raise the pressure in the several filter assemblies 154 enough to dislodge the accumulated solids on the outer surface of the porous filtering elements 157.

A particular advantage in this invention in the various disclosures thereof resides in the feature of utilizing a relatively small amount of compressed gas to induce into the system a much larger amount of purging gas for cleaning purposes. Thecompressed gas on passing through the jet-like slot forms a vortex in the interior of the ever-open passage, and this arrangement is operable even when the pressure of the compressed gas is comparatively low. In a typical example of the invention shown in FIG. 1, utilizing filter tubes that were 8 inches in diameter and 6 feet long, under one set of operating conditions, relating to specific opening of the slot 44, the following table shows the ratio of pressure and quantity of induced air.

| Internal Bag Plant Air Supply (PSIG) | Pressure (Inches Water Gauge) | Induced Air (CFM) |
| --- | --- | --- |
| 20 | 2 | 50 |
| 40 | 4 | 104 |
| 60 | 6 | 302 |
| 80 | 9 | 371 |
| 100 | 15 | 452 |
| 120 | 18 | 520 |

The foregoing advantage has not been obtainable with prior art arrangements. Utilizing a relatively constant pressure of the compressed cleaning gas, variable quantities of air induced into the filtering media can be obtained by varying the size of the slot opening 44, or the diameter and length of the ever-open passage 42.

In the foregoing disclosures, the filtering media has been disclosed as being composed of flexible fabric material, but the invention is not limited in that respect, in that relatively non-flexible porous elements will serve the same purpose. Likewise, for simplicity of disclosure, only one or two filtering elements have been shown in each modification of the invention. However, in practice, the filtering elements are, in general, arranged in banks or groups, and it is a common practice to provide a multiplicity of banks of filter elements wherein each bank of elements is cleaned or purged, whle the remaining banks of elements continue to filter the gaseous suspension, so that the filtration operation is more or less continuous.

The invention is defined in the terms of the appended claims.

I claim:

1. In a method of filtering a gaseous fluid in which a normally established flow of said fluid passes through a chamber divided into a dust-gas zone and a clean-gas zone, and in which said zones are further disposed on opposite sides of a permeable filtering medium and in which said normally established flow occurs from said dust-gas zone to said clean-gas zone through said permeable filtering medium, the improvements in which said normally established flow passes through an ever-open aerodynamically configured venturi passage formed with a frusto conical inlet, located on one side of said filter medium and with its opposite open ends disposed in the same one of said zones, the step of maintaining permeability of said filtering medium by injecting peripherally into the said conical inlet of said passage in a direction at least partially opposite to the direction of said normally established flow and converging at an angle to form a cone the apex whereof coincides with the axis of the venturi, another gaseous fluid having a pressure greater than the pressure in either of said zones, said gaseous fluid being caused to emerge into said passage as a hollow conical jet converging from the wall of said passage toward the axis thereof to block the normal flow through said passage and also induce the flow of a large volume of relatively clean gas from one of the zones to and through said passage in a direction opposite the normal flow to dislodge accumulated particles from the filter medium.

2. The process claimed in claim 1, in which the pressurized fluid is admitted to said ever-open passage under the control of a variable sized orifice.

3. The process claimed in claim 1, in which the pressurized fluid is admitted to said ever-open passage through an annular orifice.

4. In apparatus for filtering solid particles from a gas in which they are suspended, embodying an enclosure formed with a gas inlet and a gas outlet; dividing means carried by the enclosure separating the interior thereof into two compartments, said dividing means being formed with an aperture therein; a porous filtering element operably associated with the aperture in said dividing means and with the dividing means separating the interior of the enclosure into a dust-gas zone and a clean-gas zone, and in which said normally established flow occurs from said dust-gas zone to said clean-gas zone through said porous filtering element; and means for inducing the movement of said gas in a normal filtering flow through said filter and enclosure to accumulate particulate matter on one surface of said porous filtering element; the improvement of means coacting with the filter element to dislodge particles from the filter, comprising an ever-open passage formed of an aerodynamically configured venturi whose opposite open ends are disposed in the same one of said zones, so that all the inducted normal flow of gas between the zones traverses said filtering element and passage in a first direction; a source of compressed gas including a channel; means forming an annular passage for the compressed gas extending from said channel to the interior of said venturi passage at one end thereof and at an angle to the axis of the passage so that the compressed gas so admitted emerges into said venturi passage from the periphery thereof to form a converging cone with its apex on the axis of the venturi passage to block the normal flow through said passage and also induce the flow of a large volume of relatively clean gas from one of the zones to and through said venturi passage in a direction opposite the normal flow to dislodge accumulated particles from the filtering element.

5. The apparatus claimed in claim 4, in which the means forming the passage has its opposite ends disposed on opposite sides of the dividing means.

6. The apparatus claimed in claim 4, in which the means forming the passage has its opposite ends both disposed on one side of the dividing means.

7. The apparatus claimed in claim 4, in which the means forming the passage has both of its opposite ends disposed in the clean-gas zone.

8. The apparatus claimed in claim 4, in which the means forming the passage has both of its opposite ends disposed in the dust-gas zone.

* * * * *